(12) United States Patent
Lesso et al.

(10) Patent No.: US 10,297,258 B2
(45) Date of Patent: May 21, 2019

(54) MICROPHONE UNIT COMPRISING INTEGRATED SPEECH ANALYSIS

(71) Applicant: Cirrus Logic International Semiconductor Ltd., Edinburgh (GB)

(72) Inventors: John Paul Lesso, Edinburgh (GB); John Laurence Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/538,619

(22) PCT Filed: Dec. 22, 2015

(86) PCT No.: PCT/GB2015/054122
§ 371 (c)(1),
(2) Date: Jun. 21, 2017

(87) PCT Pub. No.: WO2016/102954
PCT Pub. Date: Jun. 30, 2016

(65) Prior Publication Data
US 2018/0005636 A1    Jan. 4, 2018

Related U.S. Application Data

(60) Provisional application No. 62/096,424, filed on Dec. 23, 2014.

(51) Int. Cl.
*H04R 3/06* (2006.01)
*H04R 19/04* (2006.01)
(Continued)

(52) U.S. Cl.
CPC .......... *G10L 19/0019* (2013.01); *G10L 15/00* (2013.01); *G10L 21/0208* (2013.01);
(Continued)

(58) Field of Classification Search
CPC ..... G10L 21/0208; G10L 19/02; G10L 15/00; G10L 19/18; G10L 25/78
(Continued)

(56) References Cited

U.S. PATENT DOCUMENTS 5,612,974 A    3/1997  Astrachan
5,737,485 A    4/1998  Flanagan et al.
(Continued)

FOREIGN PATENT DOCUMENTS

EP      1154408 A2    11/2001
WO   2010030889 A1     3/2010
WO   2014189931 A1    11/2014

OTHER PUBLICATIONS

Chen et al."A sub-Nyquist rate sampling receiver exploiting compressive sensing.", 2011, IEEE Transactions on Circuits and Systems I: Regular Papers 58.3 (2011): 507-520.*
(Continued)

*Primary Examiner* — Olujimi A Adesanya
(74) *Attorney, Agent, or Firm* — Jackson Walker L.L.P.

(57) ABSTRACT

A microphone unit has a transducer, for generating an electrical audio signal from a received acoustic signal; a speech coder, for obtaining compressed speech data from the audio signal; and a digital output, for supplying digital signals representing said compressed speech data. The speech coder may be a lossy speech coder, and may contain a bank of filters with center frequencies that are non-uniformly spaced, for example mel frequencies.

20 Claims, 6 Drawing Sheets

(51) Int. Cl.
  *G10L 19/00* (2013.01)
  *H04R 3/00* (2006.01)
  *G10L 25/78* (2013.01)
  *G10L 21/0208* (2013.01)
  *G10L 25/24* (2013.01)
  *G10L 15/00* (2013.01)

(52) U.S. Cl.
  CPC ............ *G10L 25/24* (2013.01); *G10L 25/78* (2013.01); *H04R 3/00* (2013.01); *G10L 19/00* (2013.01); *H04R 2201/003* (2013.01)

(58) Field of Classification Search
  USPC ............................................. 704/251, 270.1
  See application file for complete search history.

(56) References Cited

U.S. PATENT DOCUMENTS

| | | | | |
|---|---|---|---|---|
| 7,076,260 | B1* | 7/2006 | Grundvig | H04M 1/72502 379/399.02 |
| 2002/0193989 | A1* | 12/2002 | Geilhufe | G10L 15/26 704/208 |
| 2004/0128137 | A1* | 7/2004 | Bush | G10L 15/26 704/275 |
| 2004/0156520 | A1* | 8/2004 | Poulsen | H04M 1/6008 381/369 |
| 2006/0034472 | A1* | 2/2006 | Bazarjani | H04R 19/005 381/111 |
| 2006/0206320 | A1* | 9/2006 | Li | G10L 21/0208 704/226 |
| 2008/0013747 | A1 | 1/2008 | Tran | |
| 2008/0201138 | A1* | 8/2008 | Visser | G10L 21/0208 704/227 |
| 2009/0204410 | A1* | 8/2009 | Mozer | G10L 15/30 704/275 |
| 2009/0307511 | A1* | 12/2009 | Fiennes | G06F 1/3215 713/323 |
| 2010/0265799 | A1* | 10/2010 | Cevher | G01S 3/8006 367/121 |
| 2013/0197920 | A1* | 8/2013 | Lesso | H04L 25/4902 704/500 |
| 2014/0244273 | A1* | 8/2014 | Laroche | G06F 1/3206 704/275 |
| 2014/0244884 | A1* | 8/2014 | Segev | G06F 13/36 710/305 |
| 2014/0257813 | A1 | 9/2014 | Mortensen | |
| 2015/0055799 | A1* | 2/2015 | Nandy | G10L 15/00 381/92 |
| 2015/0058001 | A1* | 2/2015 | Dai | H04R 3/00 704/231 |
| 2015/0350772 | A1* | 12/2015 | Oliaei | H04R 1/04 381/111 |
| 2016/0066113 | A1* | 3/2016 | Elkhatib | H04R 29/004 381/56 |
| 2018/0005636 | A1* | 1/2018 | Lesso | H04R 3/00 |

OTHER PUBLICATIONS

International Search Report and Written Opinion of the International Searching Authority, International Application No. PCT/GB2015/054122, dated Mar. 23, 2016.
Combined Search and Examination Report under Sections 17 and 18(3), Application No. GB1509483.2, dated Jan. 26, 2016.
Combined Search and Examination Report under Sections 17 and 18(3), Application No. GB1522666.5, dated May 31, 2016.
Laska, Jason, et al., "Random Sampling for Analog-to-Information Conversion of Wideband Signals", Workshop on Design, Applications, Integration and Software, 2006 IEEE Dallas, Oct. 1, 2006, pp. 119-122.

* cited by examiner

MICROPHONE UNIT COMPRISING INTEGRATED SPEECH ANALYSIS

This disclosure relates to reducing the data bit rate on the interface of digital microphones, for example to minimise power consumption in Always-On Voice modes, while still passing enough information to allow downstream keyword detection or speech recognition functions.

BACKGROUND

Audio functionality is becoming increasingly prevalent in portable devices. Such functionality is present not only in devices such as phones that are reliant audio technology, but also in other wearable equipment or devices that may be controlled by voice, for instance voice-responsive toys such as listening-talking teddy bears. Such devices, including phones, will spend little of their time actually transmitting speech, yet one or possibly more microphones may be permanently enabled listening out for some voice command. Even a wearable accessory may be continuously on, awaiting a voice command, and will have little space for a battery, or may rely on some solar or mechanical energy harvesting, and so has severe power consumption requirements in a continuous standby mode as well as in a low-duty-cycle operating mode.

Microphone transducer and amplifier technology has improved, but generally a microphone package needs to drive its output signal some distance. Digital transmission offers advantages including noise immunity, but the usual formats for transmission of digital data from microphones are not particularly efficient in terms of signal line activity and the consequent power consumed in charging parasitic capacitances though a supply voltage at every logic level transition.

In a portable device such as a phone or tablet, containing one or more digital microphone, the digital microphone signal may have some distance to go from the microphone to a centralised smart codec chip or such, along a ribbon cable, or flex, or even across a densely populated printed circuit board. Even worse are applications where the microphone may be in a headset or earbuds or some acoustically desirable position on the user's clothing, distant from the handset or the main module of a distributed device.

However, even when largely otherwise inactive, there may be sophisticated signal processing to be performed, for example speaker recognition during voice-triggered wake-up, so solutions such as grossly degrading the resolution of the ADC therein may lead to unacceptable downstream processing results.

There is thus a requirement to reduce the power consumed in sending digital microphone data across a wired digital transmission link, while still conveying enough useful information in the transmitted signal to allow downstream function such as speech recognition.

Figure 1:
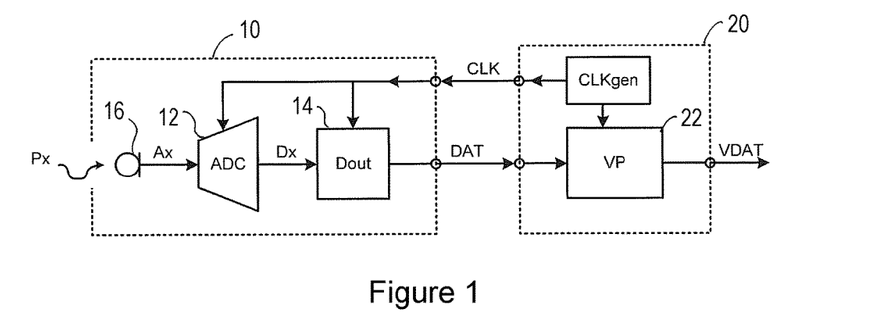
FIG. 1 illustrates an audio processing system.
Figure 2:
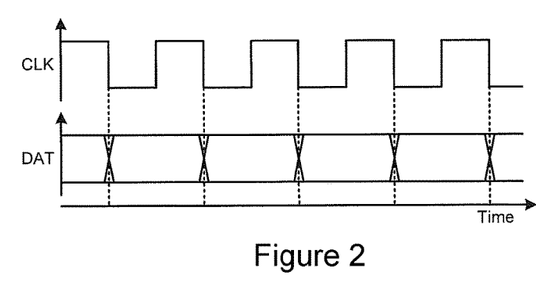
FIG. 2 illustrates signals in the audio processing system of FIG. 1.

FIG. 1 illustrates a conventional digital microphone 10 communicating with a smart codec 22 in a host device 20, for example a phone, and FIG. 2 illustrates the operating waveforms in a conventional digital microphone interface. A host device 20 transmits a clock CLK, typically at a frequency such as 3 MHz, to the microphone 10, which uses this to clock an ADC 12 and to clock out from digital buffer interface Dout 14 a 1-bit oversampled delta-sigma stream DAT representing the acoustic signal input Px to the microphone transducer 16 providing the ADC input. Power is consumed in the system by the host 20 transmitting this clock signal CLK, and in particular by the microphone in sending a data stream DAT with an average 1.5 MHz transition rate.

Power may be reduced by operating at a lower clock rate, say 768 kHz, but this greatly increase the in-band quantisation noise or conversely restricts the usable bandwidth for a particular noise level. Even this only reduces the power by a factor of 4, so the power consumption is still significant, particularly in larger form factor devices or long cable runs.

Transmitting a delta-sigma stream is notably less efficient in terms of data bit rate and transition rate than transmitting a serial multi-bit pulse-code-modulated stream, but the latter generally requires an additional clock wire to transmit clocks to mark the start of each multi-bit word.

Secondly we note that an unfortunate side effect of reducing the delta-sigma sample clock rate may be to limit the bandwidth usable in terms of background quantisation noise to say 8 kHz rather than say 20 kHz. This may increase the word error rate (WER) for Voice Key Word detection (VKD). This may in turn lead to a higher incidence of false positives and the system may spend more time in its awake mode thus significantly affecting the average complete system power consumption.

Additionally there is also a prevalent requirement for functions requiring even more accurate input audio data streams, such as speaker identification, as part of a voice-triggered wake-up function. It is known that using a wider bandwidth for the speaker identification captures more speech signal components and thus relaxes the need for high signal-to-noise (SNR) (e.g. relaxes the need for low acoustic background noise, or carefully optimised microphone placement) to get high enough accuracy for biometric purposes. Even in a high SNR environment a relatively wide signal bandwidth may improve speaker verification accuracy. This is at odds with the concept of reducing the frequency of the digital microphone clock to reduce the power consumption.

SUMMARY

According to a first aspect of the invention, there is provided a microphone unit, comprising:
 a transducer, for generating an electrical audio signal from a received acoustic signal;
 a speech coder, for obtaining compressed speech data from the audio signal; and
 a digital output, for supplying digital signals representing said compressed speech data.

In embodiments of the invention, the microphone unit comprises a packaged microphone, for example a MEMS microphone, with on-chip or co-packaged integrated speech coder circuitry. This circuitry transmits data out of this package on a PCB trace or possibly headset cable to downstream circuitry that may perform more complex functions such as speech recognition, the transmitted data representing speech information coded in a speech-compressed format at a low bit rate to reduce the power consumed in physically transmitting the data.

In this disclosure, uncompressed data can be regarded as a numeric representation of samples in an uniformly sampled system, where the in-band signal is an approximation, in the audio band, of the audio input waveform, whereas compressed data is typically derived from uncompressed data in such a way that the digital stream no longer directly represents the above, and has a lower bit rate.

Speech coding is an application of data compression of digital audio signals containing speech. Speech coding uses speech-specific parameter estimation using audio signal processing techniques to model the speech signal, and may be combined with generic data compression algorithms to represent the resulting modelled parameters in a compact bitstream.

Thus, compressed speech data may be [usually digital] data representing an audio signal in terms of speech-specific parameters calculated from the signal. For example, this may be the signal energy in a set of non-uniformly spaced frequency bins, or may use sub-band coding via say ADPCM of each sub-band. Data compression techniques may then be applied to these time-varying parameters, for example recoding scalars or vectors according to some codebook.

As examples, embodiments of the invention may use any speech compression standard, for example one using MDCT, MDCT-Hybrid subband, CELP, ACELP, Two-Stage Noise Feedback Coding (TSNFC), VSELP, RPE-LTP, LPC, Transform coding, or MLT, with suitable examples being AAC, AC-3, ALAC, ALS, AMBE, AMr, AMR-WB, AMR-WB+, apt-X, ATRAC, BroadVoice, CELT, Codec2, Enhanced AC-3, FLAC, any of the group of G.7xx standards, GSM-FR, iLBC, iSAC, Monkey's Audio, MP2, MP3, Musepack, Nellymoser Asao, Opus, Shorten, SILK, Siren 7, Speex, SVOPC, TTA, TwinVQ, Vorbis, WavPack, or Windows Media Audio.

DETAILED DESCRIPTION

Figure 3:
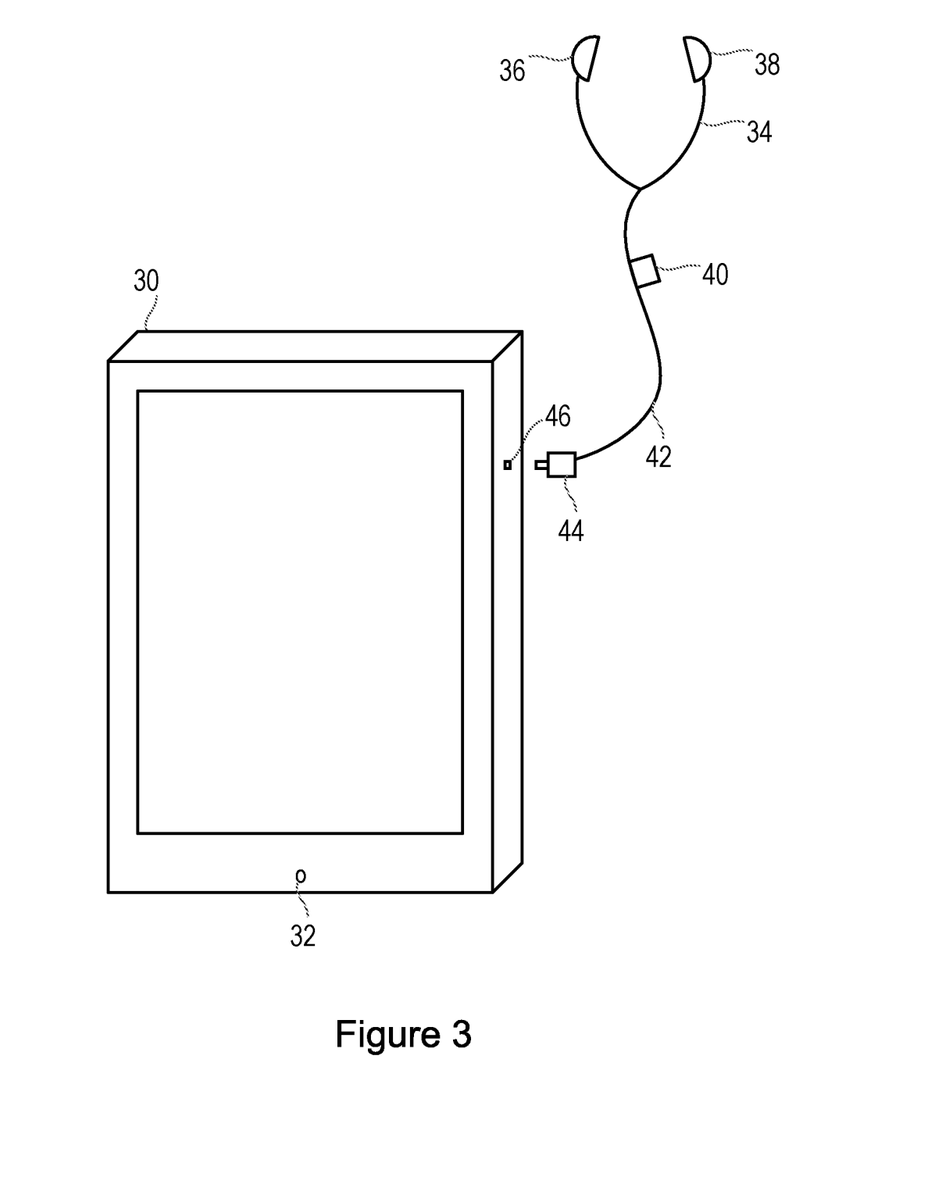
FIG. 3 illustrates a system, comprising a host device and an accessory.

FIG. 3 shows an audio system, as just one example of a system using the methods described herein.

Specifically, FIG. 3 shows a device 30, which in this example takes the form of a smartphone or tablet computer. The methods described herein may be used with any device, but are described herein with reference to a particular example in which the device is a portable communications device. Thus, in this example, the host device 30 has audio processing capability.

FIG. 3 shows an audio input 32, near which there is located a microphone, within the body of the device 30 and therefore not visible in FIG. 3. In other devices, there may be multiple microphones. FIG. 3 also shows an accessory device 34, which in this example takes the form of a pair of earphones, but which may be any device, in particular any audio accessory device. In this example, the pair of earphones has two earpieces 36, 38, each of which includes a speaker for reproducing sound in response to audio signals transferred from the host device 30. Each of the earpieces 36, 38 also includes at least one microphone, for example for detecting ambient noise in the vicinity of the wearer.

Signals representing the ambient sound are then transferred from the earphones to the host device 30. The host device may then perform various functions. For example, the host device may perform a noise cancellation function using an algorithm and generate anti-noise signals that it transfers to the earphones for playback. The effect of playing back the anti-noise signals is that the level of ambient noise heard by the wearer is reduced, and the wanted sounds (music, speech, or the like) that are also being transferred from the host device 30 are therefore more audible.

The accessory device 34 in this example also includes a microphone 40 that is positioned near to the user's mouth when wearing the earphones. The microphone 40 is suitable for detecting the user's speech. The accessory device 34 may be connected to the host device 30 by means of a cable 42. The cable 42 is detachable from at least one of the portable communications device and the audio accessory. In some embodiments, the cable 42 is permanently attached to the accessory device 34, and may be provided with a jack 44, to allow mechanical and electrical connection to or disconnection from the host device via a socket 46 provided on the host device. The cable may be in any suitable format.

The host device 30 includes circuitry for receiving signals from the microphone or microphones within the body of the device 30 and/or from the microphones in the earpieces 36, 38, and/or the microphone 40. The circuitry may for example include a codec 52, audio DSP, or other processing circuitry, which in turn may be connected to circuitry within the host device 30 such as an applications processor, and/or may be connected to a remote processor.

For example, the processing circuitry may be able to perform a speech processing function, such as recognising the presence of a trigger phrase in a speech input received by one or more of the microphones, identifying a speaker of the speech input, and/or recognising the content of a spoken command in order to be able to control the host device or another connected device on the basis of the user's spoken command.

Figure 4:
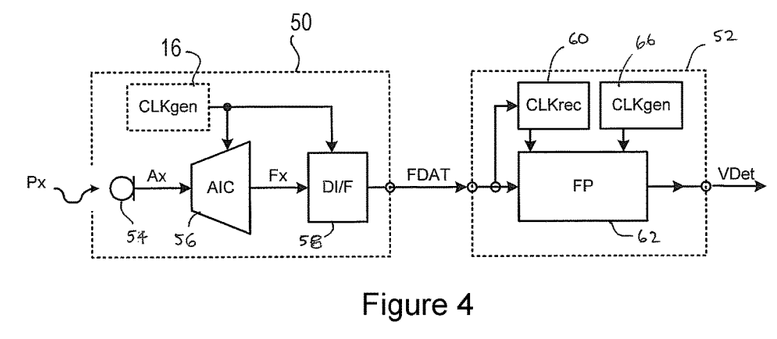
FIG. 4 illustrates an audio processing system.

FIG. 4 shows an embodiment with a microphone unit 50 having a digital transmission format and method, for communication to a downstream smart codec 52, audio DSP, or other processing circuitry.

The microphone unit 50 comprises a transducer 54, an analogue-to-information converter (AIC) 56 and a digital output driver 58.

The analogue-to-information converter 56, or speech coder, or feature extraction block, may take several forms. It is well known that brute force digitisation of an audio signal is grossly inefficient in terms of the useful information conveyed, or usually required, as interpreted by say the human ear and brain or some machine equivalent. The basic concept is to extract features of the audio signal that may be particularly useful when interpreted downstream, as illustrated by the data stream Fx in FIG. 4. A digital interface 58 then transmits a data stream FDAT carrying this coded speech signal to the codec 52. In one embodiment, a clock recognition block 60 in the codec 52 recovers some clock from the incoming data, and then a feature processing block 62 operates on the received feature information to perform functions such as voice activity detect or speaker recognition, delivering appropriate flags VDet to downstream processing circuitry or to control or configure some further or subsequent processing of its own. The codec 52 may comprise a clock generation circuit 66, or may receive a system clock from elsewhere in the host device.

Preferably the AIC 56 is asynchronous or self-timed in operation, so does not require a clock, and the data transmission may then also be asynchronous, as may at least early stages of processing of the feature data received by the codec. It may comprise an asynchronous ADC, for instance an Asynchronous Delta-Sigma Modulator (ADSM) followed by other analogue asynchronous circuitry or self-timed logic circuitry for digital signal processing.

However the microphone may generate its own clock if required by the chosen AIC circuit structure or FDAT data format.

In some embodiments the microphone unit may receive at least a low-frequency clock from the codec or elsewhere such as the system real time clock for use to synchronise or tune its internal clock generator using say locked-loop techniques. However, as will be discussed below, the feature data to be transmitted may typically be a frame produced at nominally say 30 Hz or 10 Hz, and the design of any speech processing function, say speech recognition, may have to accommodate a wide range of pitches and spoken word rate. Thus in contrast to the use case where music has to be recorded with accurate pitch and where any jitter may lead to unmusical intermodulation, the clock in the voice recognition mode does not need an accurate or low-jitter sampling clock, so an on-chip uncalibrated low-power clock 64 may be more than adequate.

In some embodiments, the data may be transmitted as a frame or vector of data at some relatively high bit rate, such that there is a transitionless interval before the each next frame.

In all of the embodiments described herein, in which a microphone unit comprises a transducer and a feature extraction block, the transducer may comprise a MEMS microphone, with the MEMS microphone and the feature extraction block being provided in a single integrated circuit.

The microphone unit may comprise a packaged microphone, for example a MEMS microphone, with on-chip or co-packaged integrated speech coder circuitry or feature extraction block.

This speech coder circuitry, or feature extraction block, may transmit data out of the package on a PCB trace or possibly a cable such as a headset cable to downstream circuitry that may perform more complex functions such as speech recognition, the transmitted data representing speech information coded in a speech-compressed format at a low bit rate to reduce the power consumed in physically transmitting the data.

Figure 5:
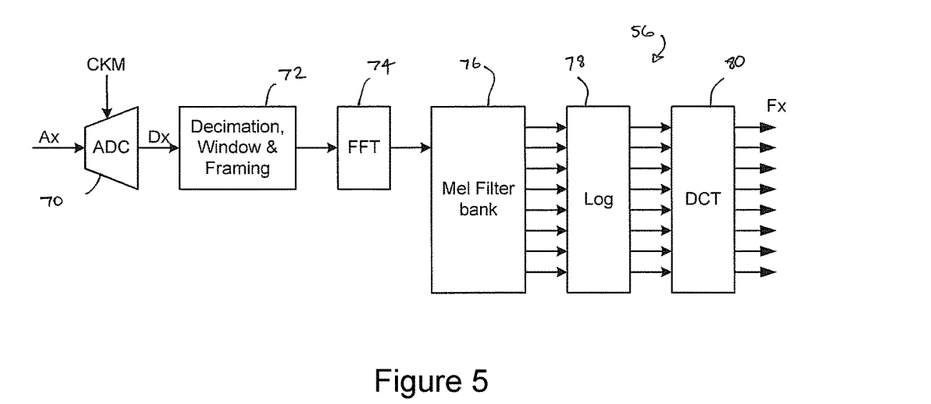
FIG. 5 illustrates a part of a microphone unit.

FIG. 5 illustrates one embodiment of an AIC 56, in which the analog input signal is presented to an ADC 70, for example a 1-bit delta-sigma ADC, clocked by a sample clock CKM of nominally 768 kHz. The delta-sigma data stream Dx is then passed to a Decimator, Window block, and a Framer 72 for decimating the data to a sample rate of say 16 ks/s, suitable windowing and then framing for presentation to an FFT block 74 for deriving a set of Fourier coefficients representing the power (or magnitude) of the signal in each one of a set of equally spaced frequency bins. This spectral information is then passed through a mel-frequency filter bank 76 to provide estimates of the signal energy in each of a set of non-equally-spaced frequency bands.

This set of energy estimates itself may be used for output. Alternatively, each of these energy estimates is passed though a log block 78 to compand the estimate, and then though a Discrete Cosine Transform block 80 to provide cepstral coefficients, known as Mel-frequency Cepstral Components (MFCC).

In one example the output cepstral coefficients comprise 15 channels of 12-bit words at a frame period of 30 ms, thus reducing the data rate from the original 1-bit delta-sigma rate of 3 Mbs/s or 786 kb/s to 6 kb/s.

Figure 6:
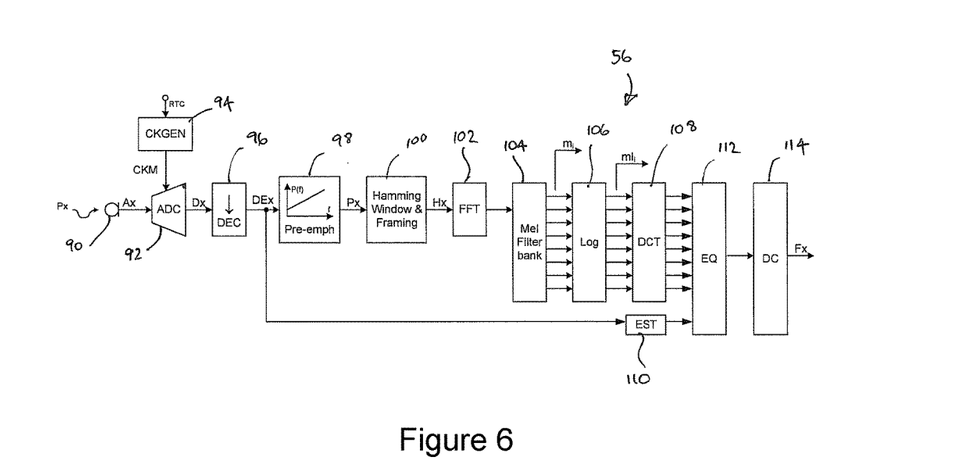
FIG. 6 illustrates a part of a microphone unit.

FIG. 6 illustrates another embodiment of an AIC 56, with some extra functional blocks in the signal path compared with FIG. 5. In some other embodiments not all of these blocks may be present.

The analog input signal from the transducer element 90 is presented to an ADC 92, for example a 1-bit delta-sigma ADC, clocked by a sample clock CKM of nominally 768 kHz generated by a local clock generator 94, which may be synchronised to a system 32 kHz Real-Time Clock for instance, or which may be independent.

The delta-sigma data stream Dx is then decimated in a decimator 96 to a sample rate of, say 16 ks/s.

It may then be passed to a pre-emphasis block 98 comprising a high-pass filter, to spectrally equalise the speech signal, most likely dominated by low-frequency components. This step may also be advantageous in reducing the effect of low-frequency background noise, for instance wind noise or mechanical acoustic background noise. There may also be a frequency-dependent noise reduction block at this point, as discussed below, to reduce noise in the frequency bands where it is most apparent.

The signal may then be passed to a windowing block 100, which may apply say a Hamming window or possibly some other windowing function to extract short-duration frames, say of time duration 10 ms to 50 ms, over each of which the speech may be considered stationary. The windowing block extracts a stream of short-duration frames by sliding the Hamming window along the speech signal by say half the frame length, or say sliding a 25 ms window by 10 ms, thus providing a frame of windowed data at a frame rate of 100 frames per second.

An FFT 102 block then performs a Fast Fourier Transform (FFT) on the set of windowed samples of each frame, providing a set of Fourier coefficients representing the power (or magnitude) of the signal in each one of a set of equally spaced frequency bins.

Each of these frame-by-frame sets of signal spectral components is then processed by a Mel-filter-bank 104, which maps and combines these linear-spaced spectral components onto frequency bins distributed to correspond more closely to the non-linear frequency sensitivity of the human ear, with a greater density of bins at low frequencies than at high frequencies. For instance, there may be 23 such bins, each with a triangular band-pass response, with the lowest frequency channel centred at 125 Hz and spanning 125 kHz while the highest frequency channel in centred at 3657 Hz and spans 656 Hz. In some embodiments, other numbers of channels or other non-linear frequency scales such as the Bark scale may be employed.

A log block 106 then applies a log scaling to the energy reported from each mel-frequency bin. This helps reduce the sensitivity to very loud or very quiet sounds, in a similar way to the non-linear amplitude sensitivity of human hearing.

The logarithmically compressed bin energies are then passed as a set of samples to a Discrete Cosine Transform block DCT 108 which applies a Discrete Cosine Transform on each set of logarithmically compressed bin energies. This serves to separate the slowly varying spectral envelope (or vocal tract) information from the faster varying speech excitation. The former is more useful in speech recognition, so the higher coefficients may be discarded. However is some embodiments these may be preserved, or possibly combined by weighted addition to provide at least some measure of energy for higher frequencies to aid in distinguishing sibilants or providing more clues for speaker identification. In some embodiments the higher order (3) coefficients may be generated in parallel with the lower ones.

The DOT block 108 may also provide further output data. For instance one component output may be the sum of all the log energies from each channel, though this may also be derived by a parallel total energy estimator EST 110 fed from un-pre-emphasised data.

There may also be a dynamic coefficient generator which may generate further coefficients based on the first-order or second-order frame-to-frame differences of the coefficients.

An equaliser (EQ) block 112 may adaptively equalise the various components relative to a flat spectrum, for instance using an LMS algorithm.

Before transmission, the data rate may be further reduced by a Data Compressor (DC) block 114, possibly exploiting redundancy or correlation between the coefficients expected due to the nature of speech signals. For example split vector quantisation to compress the MFCC vectors. In one example feature vectors of dimension 14 say may be split into pairs of sub vectors, each quantised to 5 or 6 bits say with a respective codebook at a frame period of 10 ms. This may reduce the data rate to 4.4 kb/s or lower, say 1.5 kb/s if a 30 ms frame period is used.

Additionally or alternatively, the data compressor may employ other standard data compression techniques.

Thus the data rate necessary to carry useful information concerning the speech content of the acoustic input signal has been reduced below that necessary for simple multi-bit or oversampled time-domain representations of the actual waveform by employing compression techniques at least in part reliant on known general characteristics of speech waveforms and of the human perception of speech, for instance in the use of non-linearly-spaced filter banks and logarithmic compression, or the separation of vocal tract information from excitation information referred to above. The outgoing data stream may be considered compressed speech data in that the output data has been compressed from the input signal in a manner particularly suitable for speech and for communication of the parameters of a speech waveform that convey information rather than general purpose techniques of signal digitisation and of compressing arbitrary data streams.

Having generated the compressed speech data, this data now needs to be physically transmitted to the codec or other downstream circuitry. In the case of an accessory connected to a host device by means of a cable (such as the headset 34 containing multiple microphones being connected to an audio device 30, as shown in FIG. 1), the output data may be transmitted simply using two wires, one carrying the data (for example 180 bits every 30 ms, in the example of FIG. 5), and the second carrying a sync pulse or edge every 30 ms. The extra power of this low clock rate clock line is negligible compared to the already low power consumption of the data line. Similarly a two-wire link may be used between a microphone in the body of a device such as a mobile phone and a codec or similar on a circuit board inside the phone.

Standard data formats such as Soundwire™ or Slimbus™ may be used, or standard three-wire interfaces such as I2S.

Alternatively, a one-wire serial interface may be employed, transmitting the data in a recurring predefined sequence of frames, in which a unique sync pattern may be sent at the start of every frame of words and recovered by simple and low power data and clock recovery circuitry in the destination device. The clock is preferably a low-power clock inside the microphone, whose precise frequency and jitter is unimportant since the feature data is nowhere near as clock critical as full-resolution PCM.

Nibbles of data may be sent using a pulse-length modulated (PLM) one-wire or two-wire format such as disclosed in published US Patent Application (US2013/0197920(A1)). The data may be sent with a sequence of pulses with a fixed leading edge, with the length of each pulse denoting the binary number. The fixed leading edge makes clock recovery simple.

Some slots in the outgoing data stream structure (PLM or non-PLM) may be reserved for identification or control functions. In this application, with continuous streams of data, occasional data bit errors may not have a serious impact. However, in some applications it may be desirable to protect at least the control data with some error-detection and/or correction scheme, e.g. based on Cyclic Redundancy Check bits embedded in the stream.

The speech coding to reduce the data rate and thus the average transition rate on the physical bus may thus greatly reduce the power consumption of the system. This power saving may be offset somewhat by the power consumed by the speech coding itself, but this processing may have otherwise had to be performed somewhere in the system in order to provide the keyword detection or speaker recognition or more general speech recognition function in any case. Also with decreasing transistor size the power required to perform a given digital computation task is falling rapidly with time.

It is known that Mel-frequency Cepstral Component (MFCC) values are not very robust in the presence of additive noise. This may lead to false positives from a downstream voice keyword detector, which may lead to this block frequently triggering futile power-up of following circuitry, with a significant effect on average system power consumption.

In some embodiments the generation method may be modified, for instances by raising the log-mel-amplitudes (generated by the block 78 in the embodiment shown in FIG. 5 or the block 106 in the embodiment shown in FIG. 6) to a suitable power (around 2 or 3) before taking the DCT (in the block 80 in the embodiment shown in FIG. 5 or the block 108 in the embodiment shown in FIG. 6), which reduces the influence of low-energy components.

In some embodiments the parameters of the feature extraction may be modified according to a detected or estimated signal-to-noise ratio or other signal- or noise-related parameter associated with the input signal. For instance the number and centre-frequency of the cepstral frequency bins over which the mel-frequency energy is extracted may be modified.

In some embodiments, the cepstral coding block may comprise or be preceded by a noise reduction block for instance directly after a decimation block 72 or 96 or after a pre-emphasis block 98 that may already have removed some low frequency noise, or operating on the windowed framed data produced by block 100. This noise reduction block may be enabled when necessary by a noise detection block. The noise detection block may be analog and monitor the input signal Ax, or it may be digital and operate on the ADC output Dx. The noise detection block may flag when the level or spectrum or other characteristic of the received signal implies a high noise level or when the ratio of peak or average signal to noise falls below a threshold.

The noise reduction circuitry may act to filter the signal to suppress frequency bins where the noise, as monitored in time periods when there appears to be no voice as monitored by a Voice Activity Detector, is likely to exceed the signal at times where there is a signal. For instance a Wiener Filter set up may be used to suppress noise on a frame-by-frame basis. The Wiener filter coefficients may be updated on a frame-by-frame basis and coefficient smoothed via a Mel-frequency filter bank followed by an Inverse Discrete Cosine Transform before application to the actual signal.

In some embodiments the Wiener noise reduction may comprise two stages. Each stage may incorporate some dynamic noise enhancement feature where the level of noise reduction performed is dependent on an estimated signal-to-noise ratio or other signal- or noise-related parameter or feature of the signal.

Various signal coding techniques where the output data transmitted is derived from the signal energies associated with each of a filter bank with non-uniformly spaced centre frequencies as described above, particularly cepstral feature extraction using MFCC coding, are compatible with many known downstream voice recognition or speaker recognition algorithms. In some cases the MFCC data may actually be forwarded from the codec, for example in an ETSI-standard MFCC form, for further signal processing either within the host device or transmitted to remote servers for processing "in the cloud". This latter may reduce the data bandwidth required for transmission, and may be used to preserve speech quality in poor transmission conditions.

However in some embodiments the microphone may be required to deliver a more traditional output signal digitising the instantaneous input audio signal in say a 16-bit format at say 16 ks/s or 48 ks/s.

There may also be other applications in which some other format of signal is required. Traditionally this processing and re-formatting of the signal might take place within a phone applications processor or a smart codec with DSP capability. However given the presence of DSP circuitry in the microphone unit, necessary to reduce digital transmission power in stand-by or "Always-On" modes, this DSP circuitry may be usable to perform other speech coding methods in other use cases. As semiconductor manufacturing processes evolve with ever-decreasing feature sizes, and as the cost of each of these processes decreases over time with maturity, it becomes more feasible to actually integrate this functionality in the microphone unit itself, leaving any more powerful processing power elsewhere in the system freer to perform higher-level tasks. Or indeed in some end applications, the requirement for other signal-processing DSP may be removed, allowing perhaps some simpler non-DSP controller processor to be used.

Figure 7:
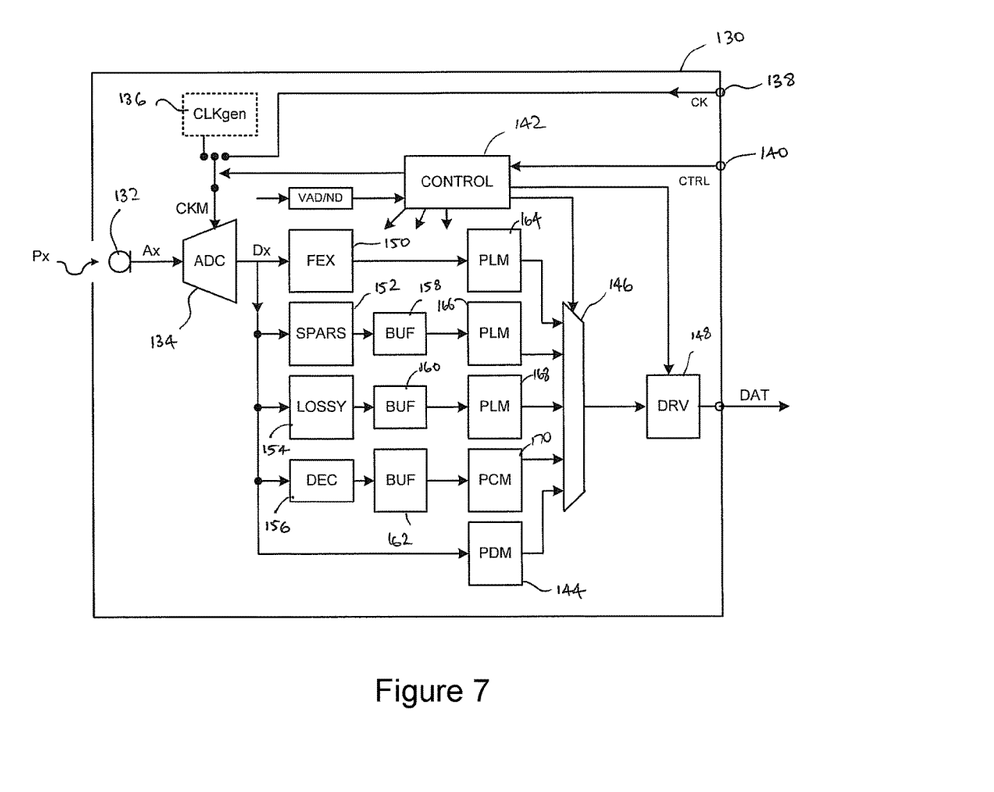
FIG. 7 illustrates a part of a microphone unit.

FIG. 7 illustrates a microphone unit 130 which may operate in a plurality of modes, with various degrees and methods of signal coding or compression. Thus, FIG. 7 shows several different functional blocks. In some other embodiments, only a subset of these blocks is present.

The analog input signal from a transducer element 132 is presented to an ADC 134, for example a 1-bit delta-sigma ADC, and the resulting delta-sigma data stream Dx is then passed to one or more functional blocks, as described below.

The ADC may be clocked by a sample clock CKM, which may be generated by a local clock generator 136, or which may be received on a clock input 138 according to the operating mode.

The microphone unit may operate in a first, low power mode in which it uses an internally generated clock and provides compressed speech data and a second, higher power, mode in which it receives an external clock and provides uncompressed data.

The operating mode may be controlled by the downstream control processor via signals received on a control input terminal 140. These inputs may be separate or may be provided by making the digital output line bi-directional. In some embodiments the operating mode may be determined autonomously by circuitry in the microphone unit. A control block 142 receives the control inputs and determines which of the functional blocks are to be active.

Thus, FIG. 7 shows that the data stream Dx may be passed to a PDM formatting block 144, which allows the digitised time-domain output of the microphone to be output directly as a PDM stream. The output of the PDM formatting block 144 is passed to a multiplexer 146, operating under the control of the control block 142, and the multiplexer output is passed to a driver 148 for generating the digital output DAT.

FIG. 7 also shows the data stream Dx being passed to a feature extraction block 150, for example for obtaining values based on using non-linear-spaced frequency bins, for instance MFCC values.

FIG. 7 also shows the data stream Dx being passed to a compressive sampling block 152, for example for deriving a sparse representation of the incoming signal.

FIG. 7 also shows the data stream Dx being passed to a lossy compression block 154, for example for performing Adaptive differential pulse-code modulation (ADPCM) or a similar form of coding.

FIG. 7 also shows the data stream Dx being passed to a decimator 156.

In some embodiments, the data stream Dx is also passed to a lossless coding block to provide a suitable output data stream.

FIG. 7 shows the outputs of the compressive sampling block 152, lossy compression block 154 and decimator 156 being connected to respective data buffer memory blocks 158, 160, 162. These allow the higher quality data generated by these blocks to be stored. Then, if analysis of a lower power data stream suggests that there is a need, power can be expended in transmitting the higher quality data for some further processing or examination that requires such higher quality data.

For example, analysis of a lower power data stream might suggest that the audio signal contains a trigger phrase being spoken by a recognized user of the device in a particular time period. In that case, it is possible to read from one of the buffer memory blocks the higher quality data relating to the same period of time, and to perform further analysis on that data, for example to confirm whether the trigger phrase was in fact spoken, or whether the trigger phrase was spoken by the recognized user, or performing more detailed key-word detection before awakening a greater part of a downstream system. Thus, the higher quality data can be used for downstream operations requiring better data, for example downstream speech recognition.

FIG. 7 also shows the outputs of the feature extraction block 150, compressive audio processing block 152, and lossy compression block 154 being output through respective pulse length modulation (PLM) encoding blocks 164, 166, 168 and through the multiplexer 146, operating under the control of the control block 142, and the driver 148. FIG. 7 also shows the output of the decimator 156 being output through a pulse code modulation (PCM) encoding block 170 and through the multiplexer 146, operating under the control of the control block 142, and the driver 148.

The physical form of the transmitted output may differ according to what operating mode is selected. For instance high-data-rate modes may be transmitted using low-voltagedifferential signalling for noise immunity, and the data scrambled to reduce emissions. On the other hand; in low-data rate modes, the signal may be low bandwidth and not so susceptible to noise and transmission line reflections and suchlike, and is preferably unterminated to save the power consumption associated with driving the termination resistance. In the lower power modes the signal swing, i.e. digital driver supply voltage, may be reduced.

Other operating parameters of the circuit may also be altered according to signal mode. For instance in low data rate modes the speed requirements of the DSP operations may be modest, and the circuitry may thus be operated at a lower logic supply voltage or divided master clock frequency than when performing more complex operations in conjunction with higher rate coding.

Although the AIC or feature-extraction based schemes above may provide particularly efficient methods of encoding and transmitting the essential information in the audio signal, there may be a requirement for the microphone unit to be able to operate also so as to provide a more conventional data format, say for processing by local circuitry or onward transmission for processing in the cloud, where such processing might not understand the more sophisticated signal representation, or where, for example, the current use case is for recording music in high quality.

In this case, it is advantageous for the initial conversion in ADC to be high quality, requiring a high quality low-jitter clock, and preferably synchronous with codec DSP main clock to avoid issues with sample-rate conversion to be synchronous to the codec master clock and/or the reference sample rate of the standard output digital PCM format. Thus, the microphone unit is operable in a first mode in which feature extraction and/or data compression is performed, and in a second mode, in which (for example) a clock is supplied from the codec, and the unit operates in a manner similar to that shown in FIG. 1.

The digital microphone unit may thus be capable of operating in at least two modes—ADC (analog-digital conversion) or AIC (analog-information conversion). In ADC mode the PCM data from the ADC is transmitted, in AIC mode data extracted from the ADC output is coded, particularly for speech.

In further embodiments, the microphone unit is operable in one mode to perform lossy low-bit-rate PCM coding. For example, the unit may contain a lossy codec such as an ADPCM coder, with a sample rate that in some embodiments may be selectable, for example between 8 ks/s-24 ks/s.

In some embodiments, the microphone unit has a coding block for performing μ-law and/or A-law coding, or coding to some other telephony standard. For example, the microphone unit in some embodiments has coding blocks for MDCT, MDCT-Hybrid subband, CELP, ACELP, Two-Stage Noise Feedback Coding (TSNFC), VSELP, RPE-LTP, LPC, Transform coding, or MLT coding.

In other embodiments, the microphone unit is operable in a mode in which it outputs compressive sampled PCM data, or any scheme that exploits signal sparseness.

Figure 8:
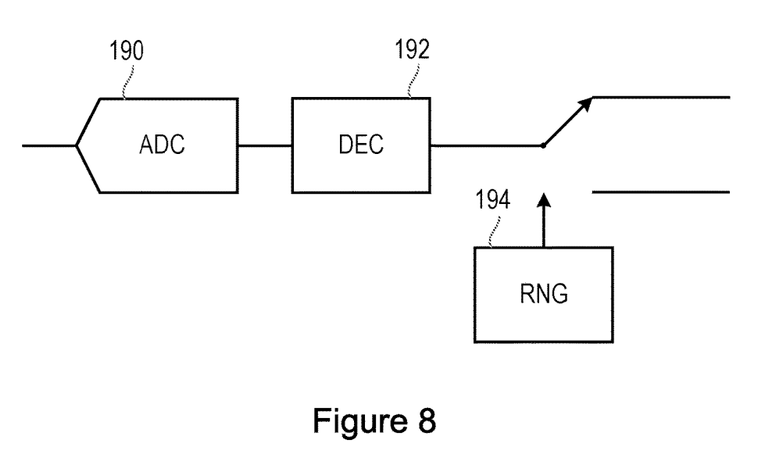
FIG. 8 illustrates a compressive speech coder.

FIG. 8 illustrates an embodiment of a compressive speech coder that may be used in any of the embodiments described or illustrated herein. The output of an ADC 190 is passed through a decimator 192 to provide (for example) 12 bit data at 16 ks/s or 48 ks/s. This data is sampled at an average sample rate of only say 48 Hz or 1 kHz but with a sampling time randomised by a suitable random number generator or random pulse generator 194.

Thus, the sampling circuit samples the input signal at a sample rate less than the input signal bandwidth, and the sampling instants are caused to be distributed randomly in time.

Figure 9:
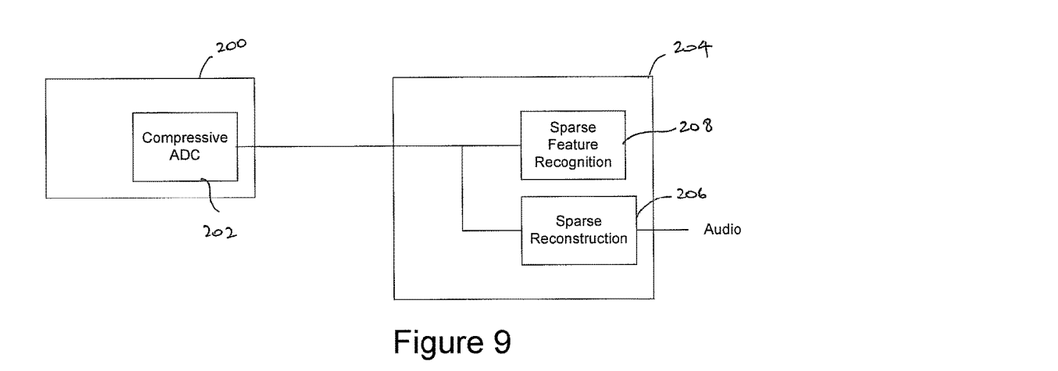
FIG. 9 illustrates an audio processing system.

FIG. 9 shows a system using such a compressive speech coder. Thus, the microphone unit 200, including a compressive ADC 202, is connected to supply very low data rate data to a codec 204. With the aid of prior knowledge of the signal statistics, downstream circuitry 206 may either perform a partial reconstruction (computationally cheap) to do sparse feature extraction in a low power mode, or a full reconstruction (computationally more expensive) to get Nyquist type voice for onwards transmission. Note there are known post-processing algorithm blocks, such as the block 208, for performing "sparse recognition" that are compatible with such compressive sampling formats. In such algorithms the sparse representation of a signal is matched to a linear combination of a few atoms from a pre-defined dictionary, which atoms may be obtained a priori by using machine learning techniques to learn an over-complete dictionary of primary signals (atoms) directly from data, so that the most relevant properties of the signals may be efficiently captured.

Sparse extraction may have some benefits in performance of feature extraction in the presence of noise. The noise is not recognised as comprising any atom component, so does not appear in the encoded data. Such ignorance of input noise may thus avoid unnecessary activation of downstream circuitry and avoid the power consumption increasing in noisy environments relative to quiet environments.

Figure 10:
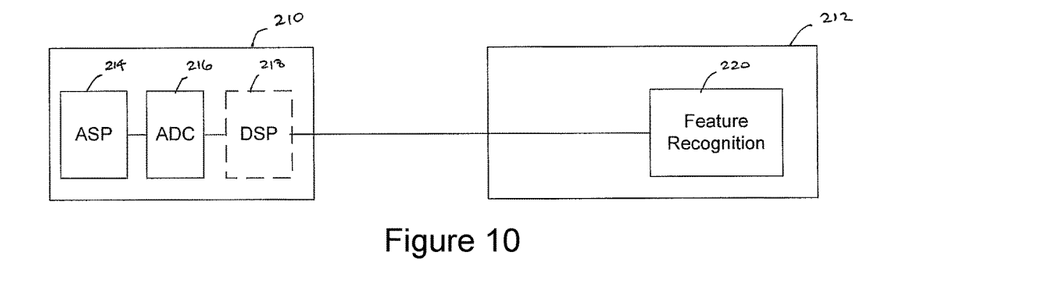
FIG. 10 illustrates an audio processing system.

FIG. 10 shows an embodiment in which a microphone unit 210 is connected to supply very low data rate data to a codec 212, and in which, to further reduce the power consumption, some, if not all, of the feature extraction is performed using Analogue Signal Processing (ASP). This a signal from a microphone transducer is passed to an analog signal processor 214, and then to one or more analog-to-digital converter 216, and then to an optional digital signal processor 218 in the microphone unit 210. Feature recognition 220 is then performed in the codec 212.

Figure 11:
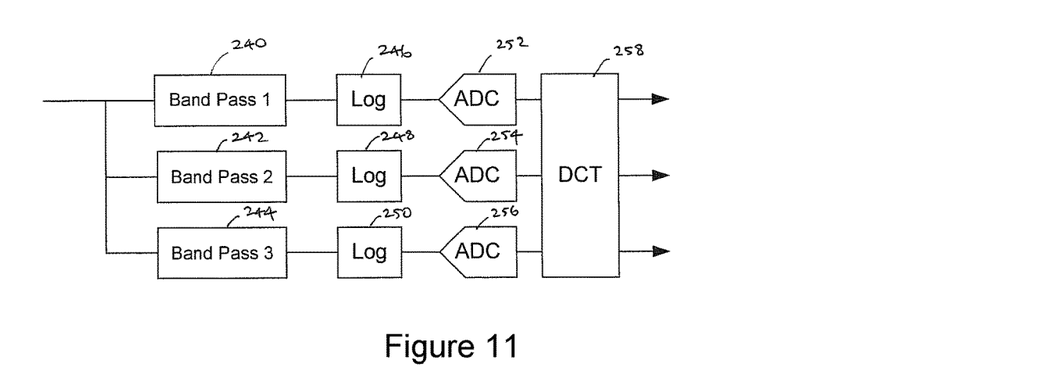
FIG. 11 illustrates a part of a microphone unit in the audio processing system of FIG. 10.

FIG. 11 shows in more detail the processing inside an embodiment of the microphone unit 210, in which a large part of the signal processing is performed by analogue rather than digital circuitry. Thus, an input signal is passed through a plurality of band pass filters (three being shown in FIG. 11 purely by way of illustration) 240, 242, 246. The band pass filters are constant Q and equally spaced in mel frequency. The outputs are passed to log function blocks 248, 250, 252, which may be achieved using standard analogue design techniques based for instance on applying the input signal via a voltage-to-current converted signal into an I-V two-port circuit with a logarithmic current-to-voltage conversion such as a semiconductor diode. The outputs are passed to a plurality of parallel ADCs 252, 254, 256. The ADCs may comprise voltage-controlled oscillators, whose frequency is used as a representation of their respective input signals. These are simple and low power, and their linearity is not important in this application. These simple ADCs may have significantly reduced power and area even in total compared to the main ADC. The state of the art for similar circuit blocks in say the field of artificial cochleas is below 20 microwatts.

In all of the embodiments described herein, the microphone, ADC, and the speech coding circuitry may advantageously be located close together, to reduce high-data-rate signal paths of the digital data before data-rate reduction. All three components may be packaged together. At least two of these three components may be co-integrated on an integrated circuit.

The microphone may be a MEMS transducer, which may be capacitive, piezo-electric or piezo resistive, and co-integrated with at least the ADC.

The skilled person will recognise that various embodiments of the above-described apparatus and methods may be, at least partly, implemented using programmable components rather than dedicated hardwired components. Thus embodiments of the apparatus and methods may be, at least partly embodied as processor control code, for example on a non transitory carrier medium such as a disk, CD- or DVD-ROM, programmed memory such as read only memory (Firmware), or on a data carrier such as an optical or electrical signal carrier. In some applications, embodiments of the invention may be implemented, at least partly, by a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re-)programmable analogue array or similar device in order to configure analogue hardware.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The invention claimed is:

1. A microphone unit, comprising:
   a transducer, for generating an analog electrical audio signal from a received acoustic signal;
   an analogue-to-digital converter, for receiving the analog electrical audio signal and generating a digital electrical audio signal;
   a feature extraction block, for extracting speech features from the digital electrical audio signal;
   an output, for supplying a digital output signal;
   a controller, for receiving a mode control signal; and
   a selector, for determining whether the digital output signal comprises the speech features extracted from the digital electrical audio signal, or time samples of said digital electrical audio signal;
   wherein the controller controls the selector in response to said mode control signal, such that the digital output signal comprises the speech features extracted from the digital electrical audio signal in a first mode, and comprises said time samples of said digital electrical audio signal in a second mode; and
   wherein the controller controls sampling of the analogue-to-digital converter in response to said mode control signal, such that the analogue-to-digital converter uses a first clock in the first mode, and uses a second clock in the second mode.

2. A microphone unit as claimed in claim 1, further comprising a speech coder, wherein the speech coder contains a bank of filters with non-uniformly spaced centre frequencies.

3. A microphone unit as claimed in claim 2, wherein the centre frequencies are mel frequencies.

4. A microphone unit as claimed in claim 1, wherein, in said second mode, the digital output signal comprises uncompressed speech data.

5. A microphone unit as claimed in claim 1, further comprising a compressive sampling coder comprising a sampling circuit which samples the input signal at a sample rate less than the input signal bandwidth, wherein the sampling instants are caused to be distributed randomly in time.

6. A microphone unit as claimed in claim 1, further comprising a speech coder, wherein the speech coder is a lossy speech coder.

7. A microphone unit as claimed in claim 6, wherein the lossy speech coder uses at least one coding technique selected from, MDCT, MDCT-Hybrid subband, CELP, ACELP, Two-Stage Noise Feedback Coding (TSNFC), VSELP, RPE-LTP, LPC, Transform coding, and MLT.

8. A microphone unit as claimed in claimed in claim 1, further comprising a speech coder, wherein the speech coder and the output are provided on a single integrated circuit.

9. A microphone unit as claimed in claim 8, wherein the transducer comprises a Micro-Electro-Mechanical Systems (MEMS) microphone provided on said integrated circuit.

10. A microphone unit as claimed in claim 1, further comprising data compression circuitry, for receiving said compressed speech data, and for generating reduced bit rate signals for supply to said digital output.

11. A microphone unit as claimed in claim 1, wherein the mode control signal is received from a separate device to which the digital output is connected.

12. A microphone unit as claimed in claim 1, wherein the mode control signal is generated in the microphone unit.

13. A microphone unit as claimed in claim 12, comprising a voice activity detector, for generating said mode control signal.

14. A microphone unit as claimed in claim 13, wherein said mode control signal causes the digital output to enter the first mode in response to detecting voice activity in the audio signal.

15. A microphone unit as claimed in claim 1, further comprising noise cancelling circuitry, for reducing the effects of ambient noise in the output digital signals.

16. A microphone unit as claimed in claim 6, wherein the lossy speech coder uses an ADPCM coding technique.

17. A microphone unit as claimed in claim 1, configured for supplying said digital signals representing said compressed speech data and having an output, for supplying a digital output signal over a Soundwire™ interface.

18. A microphone unit as claimed in claim 2, wherein the controller controls the selector in response to said mode control signal, such that the digital output signal comprises an output of the speech coder in a third mode.

19. A microphone unit as claimed in claim 6, wherein the controller controls the selector in response to said mode control signal, such that the digital output signal comprises an output of the speech coder in a third mode.

20. A microphone unit as claimed in claim 1, comprising a clock generator for generating said first clock, and an input for receiving a clock signal to be used as said second clock.

* * * * *

UNITED STATES PATENT AND TRADEMARK OFFICE
CERTIFICATE OF CORRECTION

PATENT NO. : 10,297,258 B2
APPLICATION NO. : 15/538619
DATED : May 21, 2019
INVENTOR(S) : Lesso et al.

Page 1 of 1

It is certified that error appears in the above-identified patent and that said Letters Patent is hereby corrected as shown below:

In the Specification

1. In Column 7, Line 6, delete "DOT" and insert -- DCT --, therefor.

2. In Column 9, Line 63, delete "low power" and insert -- low power, --, therefor.

3. In Column 11, Line 2, delete "hand;" and insert -- hand, --, therefor.

Signed and Sealed this
First Day of October, 2019

Andrei Iancu
*Director of the United States Patent and Trademark Office*